US009824579B2

(12) United States Patent
Patkar

(10) Patent No.: US 9,824,579 B2
(45) Date of Patent: Nov. 21, 2017

(54) METHOD AND ELECTRONIC DEVICE FOR SELECTING AND CONTROLLING A HOME NETWORK DEVICE (HND)

(71) Applicant: Samsung Electronics Co., Ltd., Suwon-si, Gyeonggi-do (KR)

(72) Inventor: Deepraj Prabhakar Patkar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 14/877,344

(22) Filed: Oct. 7, 2015

(65) Prior Publication Data

US 2016/0098923 A1 Apr. 7, 2016

(30) Foreign Application Priority Data

Oct. 7, 2014 (IN) .......................... 5021/CHE/2014

(51) Int. Cl.

*H04B 13/02* (2006.01)
*G08C 23/04* (2006.01)
*G08C 17/02* (2006.01)

(52) U.S. Cl.

CPC ............. *G08C 23/04* (2013.01); *G08C 17/02* (2013.01); *G08C 2201/40* (2013.01)

(58) Field of Classification Search

CPC ..... G08C 23/04; G08C 17/02; G08C 2201/40
USPC .......................................................... 398/106
See application file for complete search history.

(56) References Cited

U.S. PATENT DOCUMENTS 7,199,719 B2 4/2007 Steinberg
2005/0149758 A1* 7/2005 Park ...................... H04L 9/3236 726/4
2007/0127394 A1* 6/2007 Stirbu ................... H04L 12/189 370/254

(Continued)

FOREIGN PATENT DOCUMENTS

EP 2 315 162 B1 9/2011

OTHER PUBLICATIONS

"Laser Guided Appliance Control System", http://1000projects.org/laser-guided-appliance-control-system-ece-project-report.html, Oct. 12, 2012.

(Continued)

*Primary Examiner* — Juan A Torres
(74) *Attorney, Agent, or Firm* — Jefferson IP Law, LLP

(57) ABSTRACT

A method and an electronic device for selecting a home network device (HND) using a controller in a home network is disclosed. The method and the electronic device relate to a sensor network, Machine Type Communication (MTC), Machine-to-Machine (M2M) communication, and technology for Internet of Things (IoT). The method and the electronic device may be applied to intelligent services based on the above technologies, such as smart home, smart building, smart city, smart car, connected car, health care, digital education, smart retail, security and safety services. The method and the electronic device for selecting and controlling a home network device (HND) in a home network using a controller and a light source are provided. The method includes selecting the HND based on a light signal from a light source, and obtaining identification information of the HND.

12 Claims, 12 Drawing Sheets

(56) References Cited

U.S. PATENT DOCUMENTS

| | | | | |
|---|---|---|---|---|
| 2007/0165787 | A1* | 7/2007 | Kim | H04L 12/2803 379/1.01 |
| 2007/0192462 | A1* | 8/2007 | Bae | H04L 12/2809 709/223 |
| 2008/0304500 | A1* | 12/2008 | Schliserman | H04L 12/2803 370/401 |
| 2011/0055715 | A1* | 3/2011 | Kim | H04L 12/12 715/740 |
| 2011/0091216 | A1 | 4/2011 | Addy | |
| 2012/0324567 | A1* | 12/2012 | Couto | H04L 41/0853 726/12 |
| 2013/0171981 | A1 | 7/2013 | Woo | |
| 2013/0183944 | A1 | 7/2013 | Mozer et al. | |
| 2013/0204408 | A1 | 8/2013 | Thiruvengada et al. | |
| 2016/0269112 | A1* | 9/2016 | Guo | H04B 10/116 |

OTHER PUBLICATIONS

"Zero Standby Power Remote Control System using Light Power Transmission",IEEE Transactions on Consumer Electronics, vol. 57, No. 4, Nov. 2011.

* cited by examiner

METHOD AND ELECTRONIC DEVICE FOR SELECTING AND CONTROLLING A HOME NETWORK DEVICE (HND)

CROSS REFERENCE TO RELATED APPLICATION(S)

This application claims the benefit under 35 U.S.C. §119 (a) of an Indian patent application filed on Oct. 7, 2014 in the Indian Patent Office and assigned Serial number 5021/CHE/2014, the entire disclosure of which is hereby incorporated by reference.

TECHNICAL FIELD

The present disclosure relates to an appliance selection in a home network. More particularly, the present disclosure relates to a visual selection of appliance using a laser beam in a home network.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

A home network is a network of devices at a home. The devices part of a network may include, but is not limited to, lights, heating, ventilation, and air conditioning (HVAC), appliances (e.g., television sets, washing machines, microwaves, etc.), security locks of gates and doors, and other systems. Connected devices in a home network may be able to talk to each other directly or through a home gateway.

In existing home networking solutions, users are provided with one or more control applications which may run on hand-held devices like a smart phone or tablet, on in home display (IHD) devices, and on traditional computers like a personal computer (PC). A control application helps in identifying a device by performing discovery within a home network, and then by listing the discovered devices. User then can select one of the devices from the list to obtain control of the device. Though the appliances might be near the user or in front of user or in sight of the user, the user must perform all the operations relating to discovery and selection of a device through a control application manually (typically, by using a smart phone). In an example scenario, consider a home equipped with 20-30 lights in a living room, 3-4 wall mounted fans, 7-8 Internet protocol (IP) cameras in a corridor, etc. In the example scenario, it is very difficult for a user to identify and select an appropriate appliance from the list of discovered appliances presented by the application. The difficulty in selecting an appropriate device is partly due to the cumbersome process of going through a list. Further, the difficulty is accentuated by the fact that multiple devices (for example, lights of the same model) can have similar identifying information. More specifically, a listing of devices generally includes display of a device's name or alias or other device specific information like a media access control (MAC) address, an IP address, etc. A device's name and other specific information is part of the device's own information, which is maintained by each device. So the device may have its name or alias as defined by device manufacturer, which is commonly a generic name. For this reason the list of devices of a same family generally will show will show same names after discovery, e.g., lights, switches, IP cameras with same models, etc.

Therefore, there is a need to simplify the process of discovering and selecting devices for control in a home network.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to enable methods and systems for visual selection of devices in a home network.

Another aspect of the present disclosure is to enable methods and systems for visual selection of a device by pointing a laser beam onto the device.

Another aspect of the present disclosure is to enable methods and systems for providing identification information of a device to a laser pointing device on detecting the laser beam from the laser pointing device.

Another aspect of the present disclosure is to enable methods and systems for providing an appropriate control user interface (UI) corresponding to the device upon receiving identification information of the device.

In accordance with an aspect of the present disclosure, a method for selecting a home network device (HND) using a controller in a home network is provided. The method includes selecting the HND based on a light signal from a light source, and obtaining identification information of the HND.

In accordance with another aspect of the present disclosure, a method for selecting and controlling a home network device (HND) using a controller and a light source is provided. The method includes selecting the HND based on a light signal using the light source, if a light beam event by the HND is detected, obtaining identification information from the HND by the controller, activating a control user interface (UI) for the HND, and sending control messages to the HND through the control UI.

In accordance with another aspect of the present disclosure, a method of obtaining control information using a controller is provided. The method includes receiving at least one light signal from at least one light source, wherein the at least one light source is associated with at least one electronic device, sending identification information of a home network device (HND) to the at least one electronic device, and receiving the control information from the at least one electronic device.

In accordance with another aspect of the present disclosure, an electronic device for selecting an HND in a home network is provided. The electronic device includes a controller and a light source. The controller is configured to select the HND based on a light signal from the light source, and obtain identification information of the HND.

In accordance with another aspect of the present disclosure, an electronic device for selecting and controlling an HND is provided. The electronic device includes a controller and a light source. The controller is configured to select the HND based on a light signal using the light source, if a light beam event by the HND is detected, obtain identification information from the HND, activate a control User Interface (UI) for the HND, and send control messages to the HND by using the control UI.

In accordance with another aspect of the present disclosure, an electronic device for obtaining control information is provided. The electronic device includes a controller configured to receive at least one light signal from at least one light source. The at least one light source is associated with at least one electronic device. The controller is configured to send identification information of an HND to at least one electronic device and obtain the control information from the at least one electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
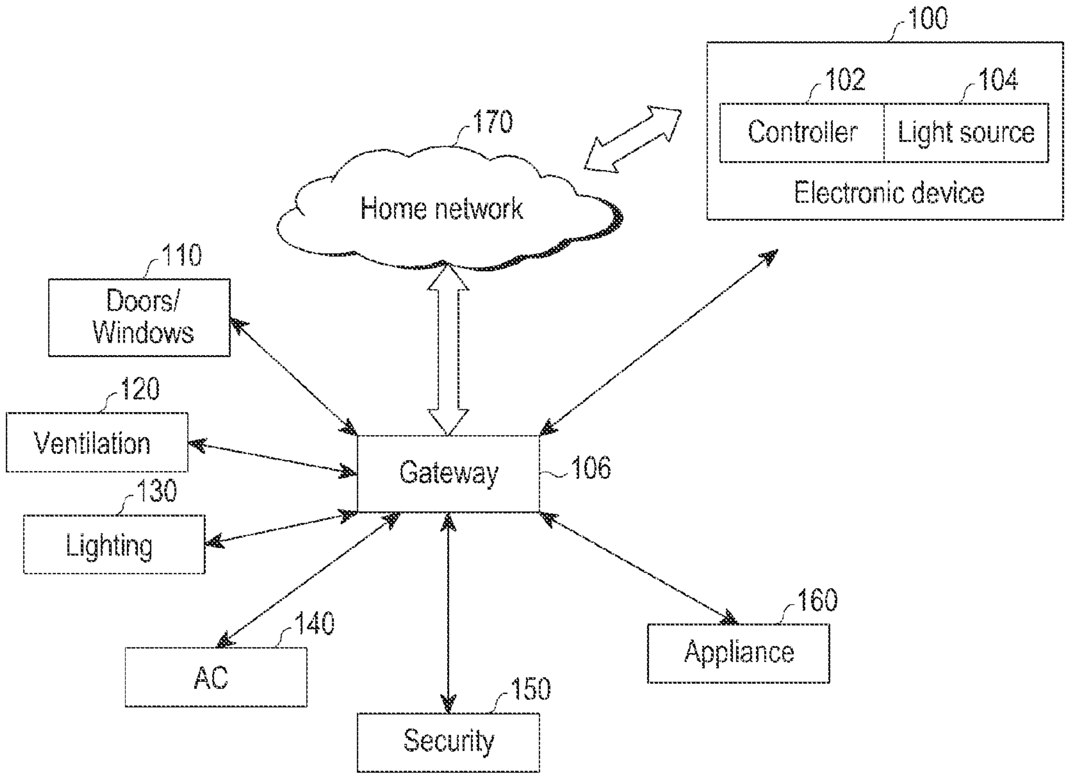
FIG. 1 illustrates an example representation of a home network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

The term “or” as used herein, refers to a non-exclusive or, unless otherwise indicated. The examples used herein are intended merely to facilitate an understanding of ways in which the embodiments herein can be practiced and to further enable those skilled in the art to practice the various embodiments herein. Accordingly, the examples should not be construed as limiting the scope of the various embodiments herein.

In the foregoing discussion and below, the use of the words, “mobile device,” and an, “electronic device,” are often used interchangeably throughout the present disclosure. Also, the terms, “home network device,” “home appliance," and, "home device," are also often used interchangeably throughout the present disclosure.

The various embodiments herein achieve a method and system for selecting a home network device (HND) in a home network using a controller.

Another embodiment herein achieves a method and system for selecting and controlling an HND in a home network using a controller and a light source.

The method includes selecting the HND by pointing a light signal from a light source. Further, the method includes obtaining identification information of the HND. In an embodiment of the present disclosure, the light source can be a laser or any other light source incorporating the properties of a laser.

In an embodiment of the present disclosure, the identification information is obtained by registering the controller as the light source, pointing the light signal from the light source towards the HND, and receiving, at the controller, the identification information from the HND.

In an embodiment of the present disclosure, the identification information is obtained by registering the controller as the light source, pointing the light signal from the light source towards the HND, and receiving, at the controller, the identification information of the HND through the gateway of the home network.

In an embodiment of the present disclosure, the identification information is obtained by registering the controller as the light source, pointing the light signal from the light source towards the HND, and receiving, at the controller, the identification information of the HND over the home network.

In an embodiment of the present disclosure, the identification information is obtained by registering the controller as the light emitting source, subscribing to beam detection events by the controller, pointing the light signal from the light source towards the HND, and receiving, at the controller, the beam detection event along with the identification information from the HND.

In an embodiment of the present disclosure, the identification information is obtained by registering the controller as the light emitting controller source, pointing the light signal from the light source towards the HND, and receiving, at the controller, a broadcast message with the identification information from the HND.

In an embodiment of the present disclosure, the identification information is obtained by registering the controller as the light source, pointing the light signal from the light source towards the HND, and receiving, at the controller, a broadcast message with identification information of the HND from the gateway of the home network.

FIG. 1 illustrates an example representation of a home network environment according to various embodiments of the present disclosure. In FIG. 1, an electronic device 100 is connected to an HND through a gateway 106, according to an embodiment of the present disclosure. In an embodiment of the present disclosure, a light source 104 is utilized to allow the electronic device 100 to interact with various home devices within the home environment. For instance, the electronic device 100 may send a light signal to a door or window 110, a ventilation device 120, a lighting device 130, an air conditioner 140, a security device 150, or a home appliance device 160.

In an embodiment of the present disclosure, the light source can be the laser, or any other light source with properties of a laser.

Referring to FIG. 1, a home network environment according to an embodiment of the present disclosure includes a home network gateway 106 that is utilized to communicate between the electronic device 100 and a home network device, where the home network gateway 106 operates as a server, bridge, or middleware and is connectable with a network. The HND is connected to the electronic device 100 over a home network 170.

The HND represents any electrical or mechanical appliance, system, or machine used to perform a household function. In the present example of FIG. 1, HNDs may include (not all shown) a television, a light fixtures/system, a heating, ventilation, and air conditioning (HVAC), a smart dish washer, washing machine, a smart refrigerator, a printer, an air conditioner, a security camera, a facsimile machine, an illumination device, a digital versatile disc (DVD) player, a doorway, a phone set, a washing machine, or the like.

In an embodiment of the present disclosure, the gateway 106 communicates with a controller 102 in the electronic device 100 through a wireless communication technology. The gateway 106 receives control signals for controlling target home devices from the controller 102 in the electronic device 100, and sends the control signals to the target home devices. The gateway 106 also receives status information from the home devices, and sends the status information to the controller 102 in the electronic device 100 for reading status information of the home devices. Therefore, a user can operate the electronic device 100 in his hands to control each individual home device at anywhere and anytime, through the gateway 106.

In an embodiment of the present disclosure, the home network gateway 106 can be implemented in the form of a personal computer (PC) or operated as middleware between the electronic device and the home devices.

In an embodiment of the present disclosure, the electronic device 100 connected to the home network selects and controls the home devices by transferring the light signal. Here, the home network may be a general mobile communication network, 3G network, or wireless Internet.

In an embodiment of the present disclosure, the electronic device 100 can be, for example but is not limited to a mobile phone, a smart phone, a personal digital assistant (PDA), a tablet, a consumer electronic device, or other electronic device with wireless communication capabilities.

The method and system can improve selection and control functions directly, since the method and system do not need to configure any device or appliance moved one room to another room in the home network. The method and system enable the device selection and control in a simple manner as the controller in the electronic device does not need to reconfigure for a device selection and control process, thus providing convenience to the user. The method and system do not require a high power laser beam such as is generally used in industrial applications.

In an embodiment of the present disclosure, the electronic device and the home device are communicated through a simple service discovery protocol (SSDP) and multicast domain name system (mDNS) for device discovery purposes, and a universal plug and play (UPnP) protocol, a living network control protocol (LnCP), a home audio video interoperability (HAVi) protocol, a Jini protocol, an intelligent grouping and resource sharing (IGRS) protocol, a digital living network alliance (DLNA) protocol, an Itophome protocol, hypertext transfer protocol (HTTP), and constrained application protocol (CoAP) for messaging purpose for home network devices.

Figure 2:
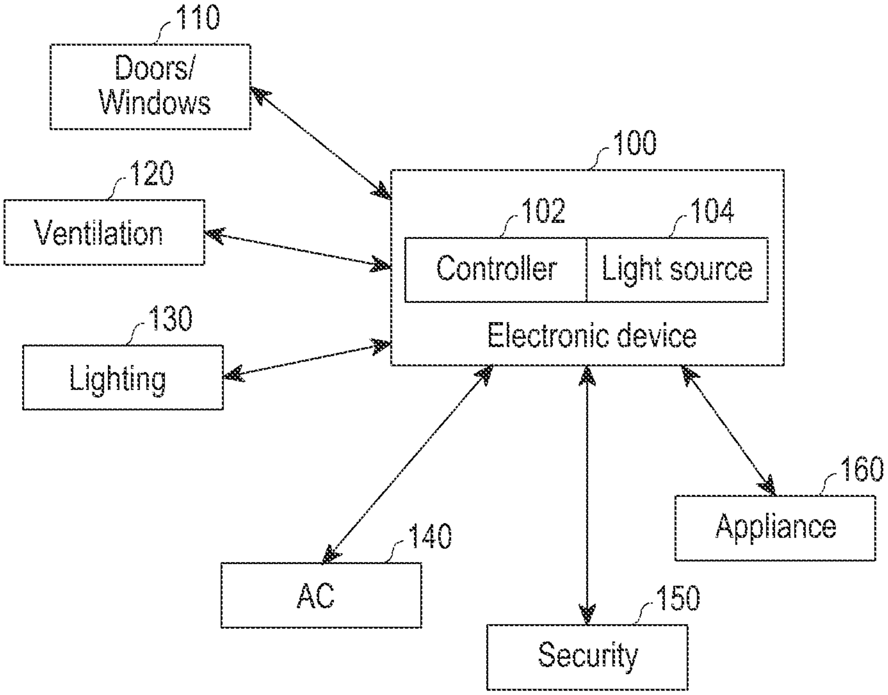
FIG. 2 illustrates an example representation of a home network environment according to various embodiments of the present disclosure.

FIG. 2 illustrates an example representation of a home network environment according to various embodiments of the present disclosure. FIG. 2 shows a scenario in which the home network device is directly controlled by the controller 102 in the electronic device 100 without requiring the gateway 106. The electronic device directly selects and controls the home device by using the light source 104 without using the gateway 106.

Referring to FIG. 2, in an embodiment of the present disclosure, the light source can be the laser, or any other light source with properties of a laser.

Figure 3A:
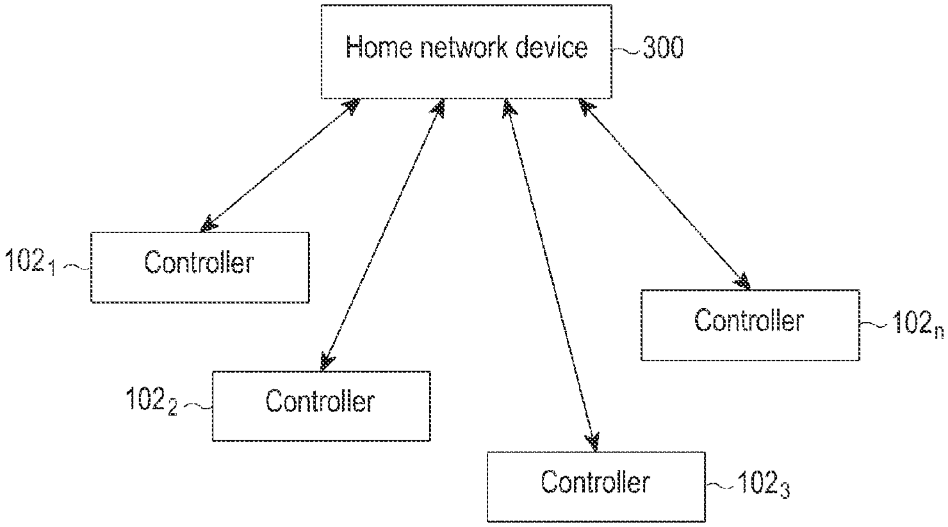
FIG. 3A is a schematic diagram of controlling a home network device from multiple controllers according to various embodiments of the present disclosure.

FIG. 3A is a schematic diagram of controlling a home network device from multiple controllers according to an embodiment of the present disclosure. The home network device 300 can be directly controlled by the multiple electronic devices 100 by using the light source 104 with the controllers $\mathbf{102}_1$-$\mathbf{102}_n$.

Figure 3B:
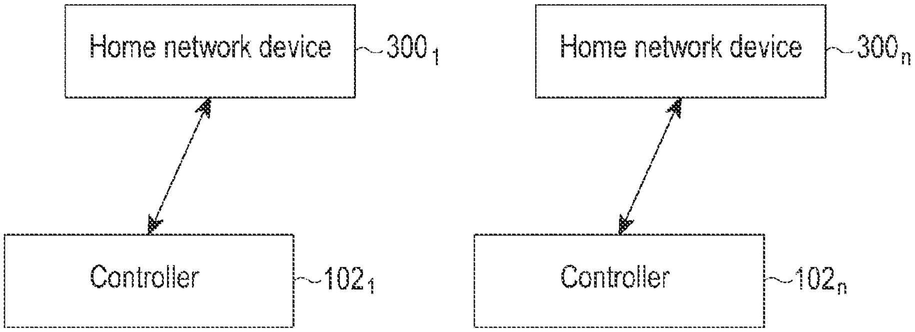
FIG. 3B is a schematic diagram of controlling home network devices using a separate controller according to various embodiments of the present disclosure.

FIG. 3B is a schematic diagram of controlling home network devices using a separate controller. Referring now to FIG. 3B, each of individual home network devices $\mathbf{300}_1$-$\mathbf{300}_n$ is controlled by an individual controller $\mathbf{102}_1$-$\mathbf{102}_n$ in the electronic device 100 and an electronic device n according to an embodiment of the present disclosure.

In an embodiment of the present disclosure, the light source can be the laser, or any other light source with properties of a laser.

In an embodiment of the present disclosure, each electronic device 100 is provided with a unique identification (UID) so that it can be uniquely identified by the home network devices. In an example, a device mapping table is generated by using the UID in the home network device, where the device mapping table can be used to map the home network device based on light source event detection.

Figure 4:
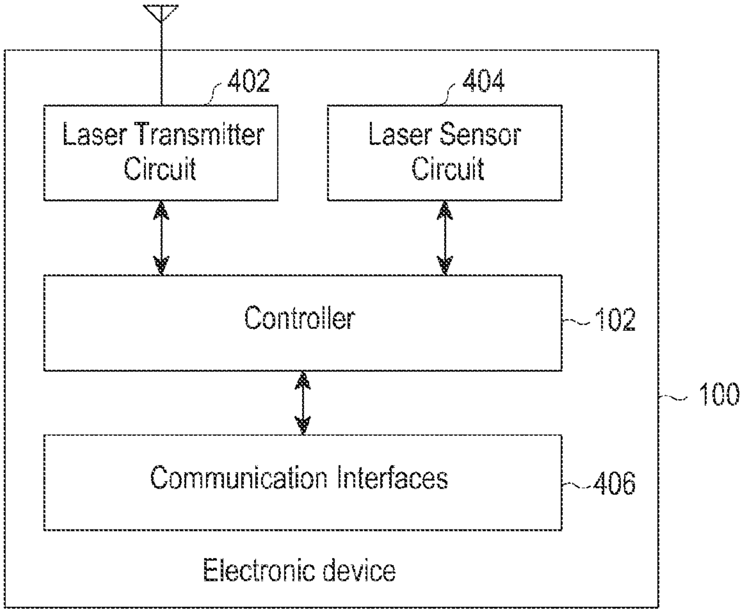
FIG. 4 is a block diagram of an electronic device according to various embodiments of the present disclosure.

FIG. 4 is a block diagram of an electronic device according to an embodiment of the present disclosure.

Referring to FIG. 4, the electronic device 100 comprises the controller 102 operated with a laser transmitter circuit 402, a laser sensor circuit 404, and a communication interface 406. The communication interface 406 is configured to perform communication with the gateway 106 for controlling the home devices 300 in the home network environment or to directly communicate with the HND 300 for controlling the home devices without using the gateway 106 in the home network environment. The laser sensor circuit 404 transmits the light beam towards the HND by using the laser transmitter circuit 402. The electronic device 100 communicates with each home device 300 through a wireless communication means that enables short-range as well as long range wireless transfer of data between the electronic device 100 and HND 300. Since an internal driver level communication is established between the electronic device 100 and the HND 300, the controller 102 in the electronic device supports the long range communication. The near field wireless signals may include, but are not limited to, infrared, BLUETOOTH, Z-wave, ZigBee, and WiFi signals. The laser sensor circuit can be a photo detection sensor.

Figure 5:
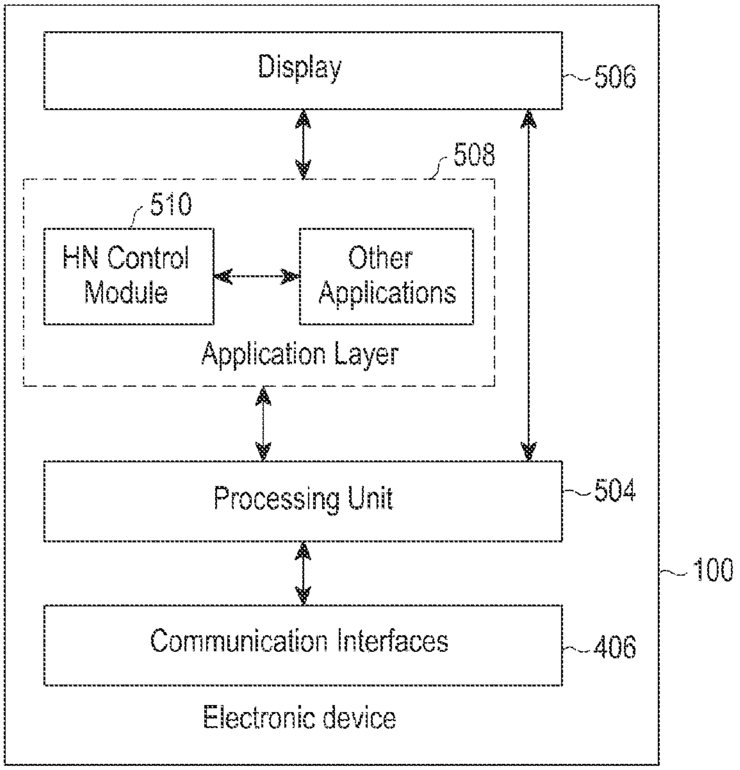
FIG. 5 is a block diagram of an electronic device according to various embodiments as disclosed herein.

FIG. 5 is a block diagram of an electronic device according to an embodiment of the present disclosure.

Referring to FIG. 5, the electronic device 100 includes a processing unit 504 coupled to the communication interface 406, a display 506, and an application layer 508. In an embodiment of the present disclosure, the processing unit 504 represents a central processing unit (CPU), microcontroller, microprocessor, digital signal processor (DSP), or logic configured to execute programming instructions associated with the electronic device 100. The display 506 displays various kinds of display content and messages under the control of the controller 102 in the electronic device 100. The display 506 may be provided through a liquid crystal display (LCD), thin film transistor (TFT), organic electroluminescence (EL), or the like. An application layer 508 includes a home network device control module 510 for controlling the HND. The communication interface 406 interfaces with communication interface 602 of the HND 300 through an HND control device 510 of the HND 300. The communication interface 406 includes a graphical control user interface (UI) for enabling input interaction between an operating user and the electronic device 100, where the UI allows for the user to select and control the individual home devices from the electronic device 100 by using the light source 104. The display 506 of the electronic device 100 represents an electronic visual display configured to display images and graphics for viewing to control the home network device, such as controlling the temperature of the HVAC or toggling the light system on and off.

The communication interface 406 can be a wireless communication interface such as wireless local area network (WLAN) interface, BLUETOOTH interface, a worldwide interoperability for microwave access (WiMAX) interface, a ZigBee interface, and a wireless universal serial bus (USB) interface, and a wired network interface.

Figure 6:
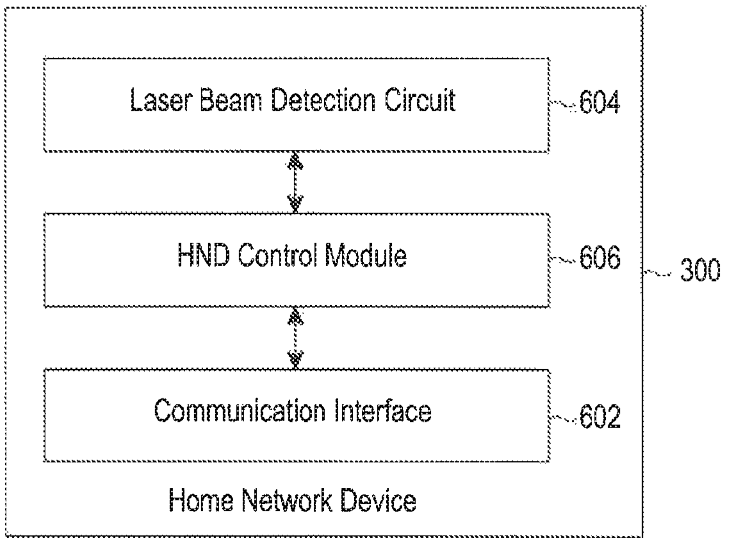
FIG. 6 is a block diagram of the home network device according to various embodiments of the present disclosure.

FIG. 6 is a block diagram of an HND according to various embodiments of the present disclosure.

Referring to FIG. 6, the HND 300 includes an HND control module 606 operated with a laser beam detection circuit 604 and the communication interface 602. The HND control module 606 facilitates communication with the electronic device 100. The HND control module 606 is configured to receive the light signal and control operations on the home network device 300 such as controlling the temperature of the HVAC or toggling the light system on and off. The home network control module 606, after receiving the light signal from the electronic device 100, sends acknowledgement information to the electronic device 100. The laser beam detection circuit 604 detects the light signal detection event from the controller 102 in the electronic device 100 and sends the light signal detection event notification to the controller 102 in the electronic device 100. In an example, the electronic device 100 can establish communication with the HND controller module 606 of an associated HND respectively, through light signal transmission from the electronic device 100 to the laser beam detection circuit 604 of an associated HND 300. The communication interface 602 is configured to operate with the HND control module 510 and the laser beam detection circuit 604. In an embodiment of the present disclosure, a storage module (not shown) is integrated in the HND 300. The storage module can be an independent physical device, or be contained in the home network control module 606. The storage module registers a number of mobile devices UID. The storage module generates and sends a unique response code to the electronic device 100 in order to obtain information from the home devices. The storage module further generates and sends a response code to the home devices in order to control the home devices to register their configuration information with the electronic device 100.

In an embodiment of the present disclosure, each electronic device 100 is provided with the UID so that it can be uniquely identified by the HNDs. In an example, the device mapping table is generated by using the UID in the HND, where the device mapping table can be used to map the HND based on the light source event detection function.

Figure 7:
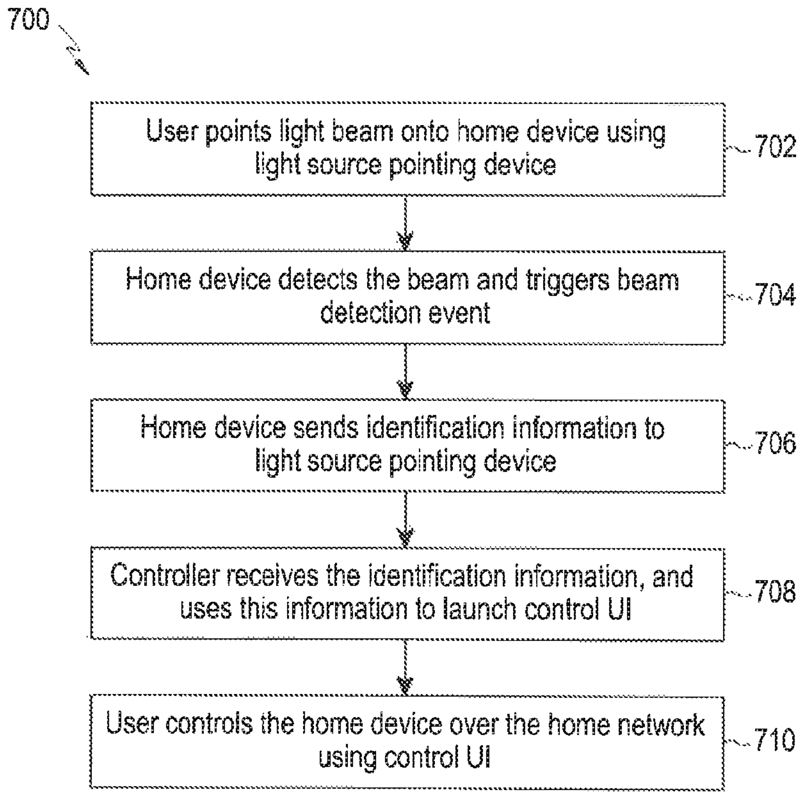
FIG. 7 is a flow diagram illustrating a method of selecting and controlling the home network device according to various embodiments of the present disclosure.

FIG. 7 is a flow diagram illustrating a method 700 of selecting and controlling an HND according to various embodiments of the present disclosure.

Referring to FIG. 7, at operation 702, a user points a light source onto the home device using a light source pointing device. In an embodiment of the present disclosure, the light source can be a laser. In an embodiment of the present disclosure, the method 700 allows the laser transmitter circuit 402 to transmit the laser beam towards the HND. At operation 704, the HND detects the beam and triggers a beam detection event. In an embodiment of the present disclosure, the method allows the laser sensor circuit 404 to detect the beam and triggers the beam detection event.

In an embodiment of the present disclosure, the home device receives the light beam from a plurality of light sources and triggers the beam detection event for all of the plurality of light sources.

At operation 706, the HND sends identification information to the light source pointing device. In an embodiment of the present disclosure, the method allows the home device control module 606 to send the identification information to the controller 102 through the communication interface 602.

In an embodiment of the present disclosure, the home device sends the identification information to each of the light sources after triggering the beam detection event for all the plurality of light sources.

In an embodiment of the present disclosure, the control module 606 sends the identification information to each light source by identifying each light source using the unique identifier associated with each light source.

At operation 708, the controller in the electronic device receives the identification information from the home device and uses the identification information to start the operation of the control UI of the electronic device.

In an embodiment of the present disclosure, the method allows the controller 102 in the electronic device 100 to receive the identification information from the home device and opening the control UI in the electronic device.

In an embodiment of the present disclosure, display 506 in the electronic device 100 opens the control UI.

In an embodiment of the present disclosure, if the home device is controlled using a plurality of controllers (as shown in FIG. 3A), then the controller in each electronic device opens the control UI in the respective device.

At operation 710, the user controls the home device over the home network. In an embodiment of the present disclosure, the method allows the controller 102 to control the home device, and the display 506 displays the control UI to the user.

For example, the home device is the lighting system and user controls brightness of the light system using the control UI displayed in the electronic device.

Further, the various actions, units, operations, blocks, or acts described in the method can be performed in the order presented, in a different order, simultaneously, or a combination thereof. Furthermore, in some embodiments of the present disclosure, some of the actions, units, operations, blocks, or acts listed in FIG. 7 may be omitted.

Figure 8:
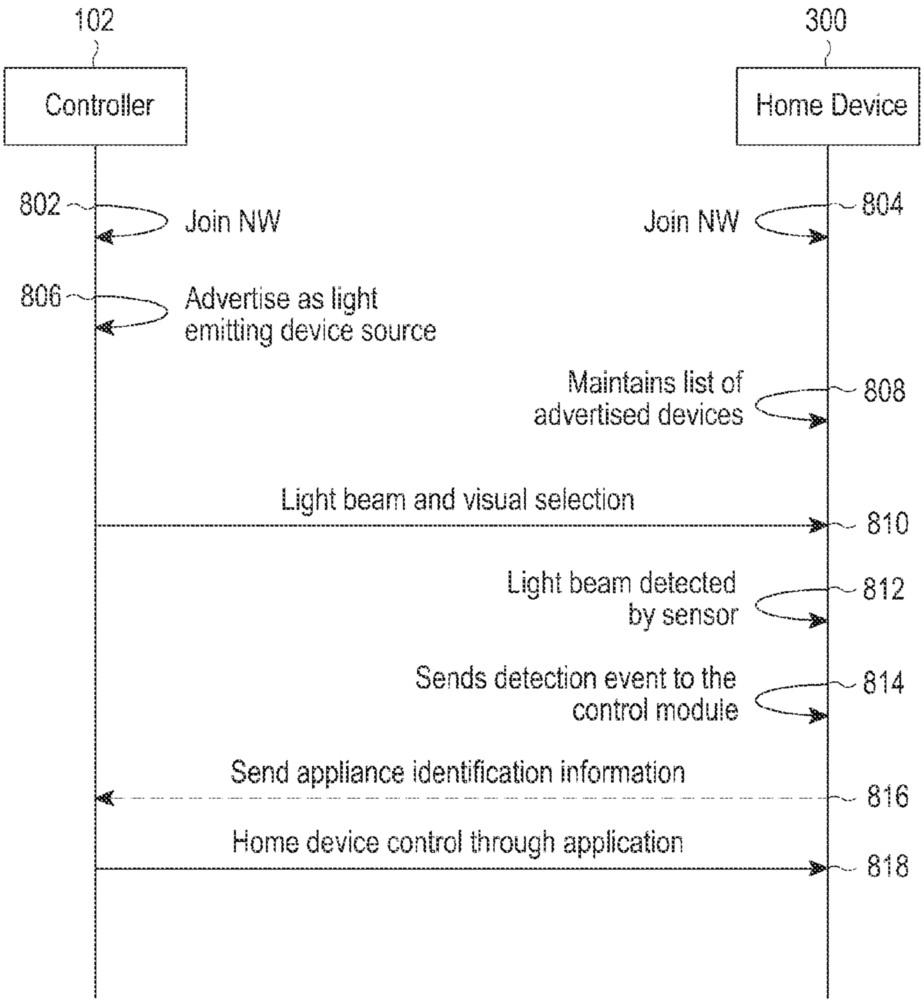
FIG. 8 is a sequence diagram showing operations involved in selecting and controlling the home network device according to various embodiments of the present disclosure.

FIG. 8 is a sequence diagram showing operations involved in selecting and controlling the HND according to various embodiments of the present disclosure. Initially, at operation 802, the controller 102 joins into the home network. The HND 300 also joins into the network at operation 804. The controller 102 advertises itself as light source emitting device at operation 806. In an embodiment of the present disclosure, the controller 102 is associated with the UID.

Referring to FIG. 8, at operation 808, the HND 300 maintains a list of advertised electronic devices. In an embodiment of the present disclosure, the home device maintains the list of advertised electronic device in a storage module. The HND 300 maintains the list by mapping each advertised device against its UID. When the user intends to select the home device 300, the user points the light beam from the light source 104 to enable visual selection of the home device 300. In an embodiment of the present disclosure, at operation 810, the controller 102 sends the light beam to the home device 300. In an embodiment of the present disclosure, the light beam can be a laser, or any other light beam with properties of a laser. The HND 300 detects the light beam at operation 812. In an embodiment of the present disclosure, the HND 300 detects the light beam using the laser beam detection circuit 604. Further, the home device 300 sends the detection event to the control module 606 at operation 814.

In an embodiment of the present disclosure, the HND control module 606 maps the beam against the advertised device and sends identification information of the HND 300 to the controller 102 at operation 816. After receiving the identification information of the HND 300, the controller 102 triggers the application control UI on the display 506 of the electronic device 100. Further, the user controls the HND 300 using the control UI at operation 818. For example, user controls the temperature of the HVAC from the displayed UI.

Figure 9:
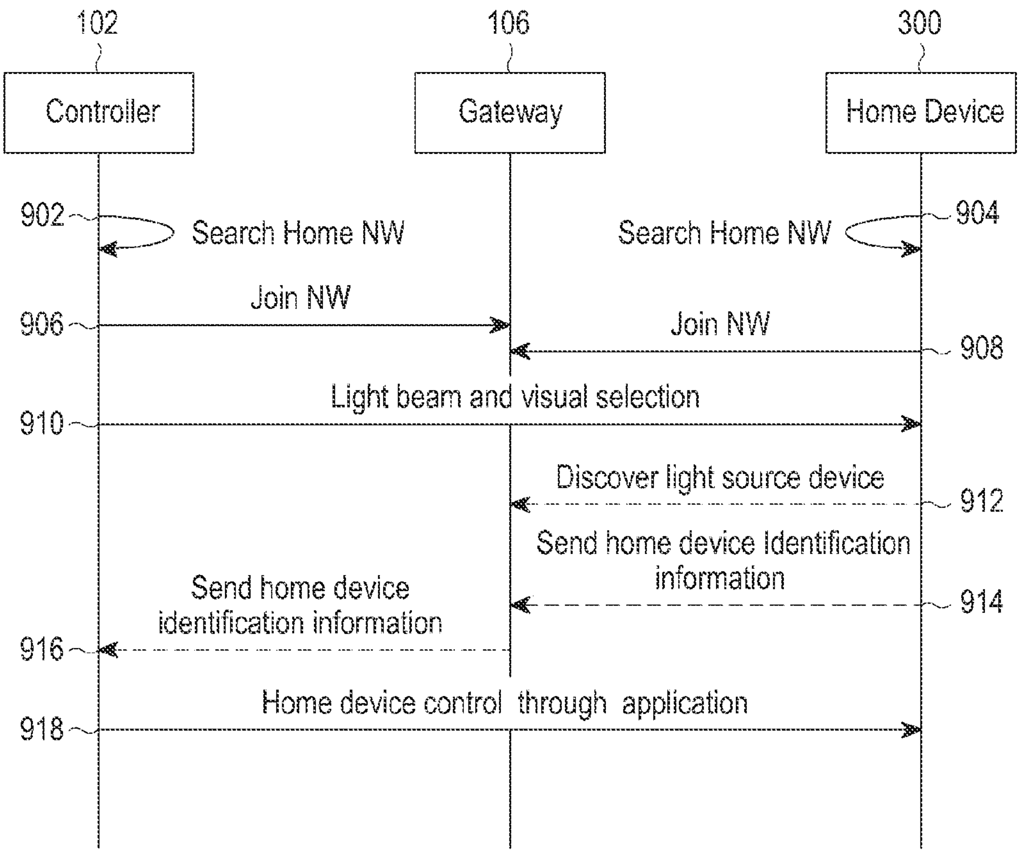
FIG. 9 is a sequence diagram showing operations involved in selecting and controlling the home network device including a gateway according to various embodiments of the present disclosure.

FIG. 9 is a sequence diagram showing operations involved in selecting and controlling the HND including a gateway according to various embodiments of the present disclosure.

Referring to FIG. 9, initially, the controller 102 searches the home network at operation 902 and the HND 300 also searches the home network at operation 904. Further, at operation 906, the controller 102 joins into the home network through the gateway 106 and the HND 300 also joins into the home network through the gateway 106 at operation 908. When the user intends to select the HND 300, the user points the light beam from the light source 104 to enable visual selection of the HND 300. At operation 910, the controller 102 sends a light beam from the light source 104 to the home device 300 to select the home device 300 through the gateway 106. In an embodiment of the present disclosure, the light source can be the laser, or any other light source with the properties of a laser.

In an embodiment of the present disclosure, if the home device 300 is selected by the controllers $\mathbf{102}_1$-$\mathbf{102}_n$ (as shown in FIG. 3A), the controllers $\mathbf{102}_1$-$\mathbf{102}_n$ send the light beam of the light source 104 to the home device 300 to select the home device 300 through the gateway 106.

In an embodiment of the present disclosure, the HND 300 discovers the light beam using the laser beam detection circuit 604 at operation 912. In an embodiment of the present disclosure, the HND 300 sends the home device identification information to the gateway 106 at operation 914. In an embodiment of the present disclosure, the device identification information is the UID. In an embodiment of the present disclosure, the gateway 106 sends the home device identification information to the controller 102 at operation 916. In an embodiment of the present disclosure, after receiving the identification information of the HND 300, the controller 102 triggers the application control UI on the display 506 of the electronic device 100. At operation 918, the user sends a control command by using the control UI on the display 506 of the electronic device 100, when the user wants to control the HND 300. For example, if the HND is a lighting device, the user controls the ON and OFF state of the lighting device from the control UI. In an embodiment of the present disclosure, the control module 606 in the home device receives the control commands and performs necessary control actions in the home device 300. For example, the control commands can be ON/OFF, temperature range, or the like.

Figure 10A:
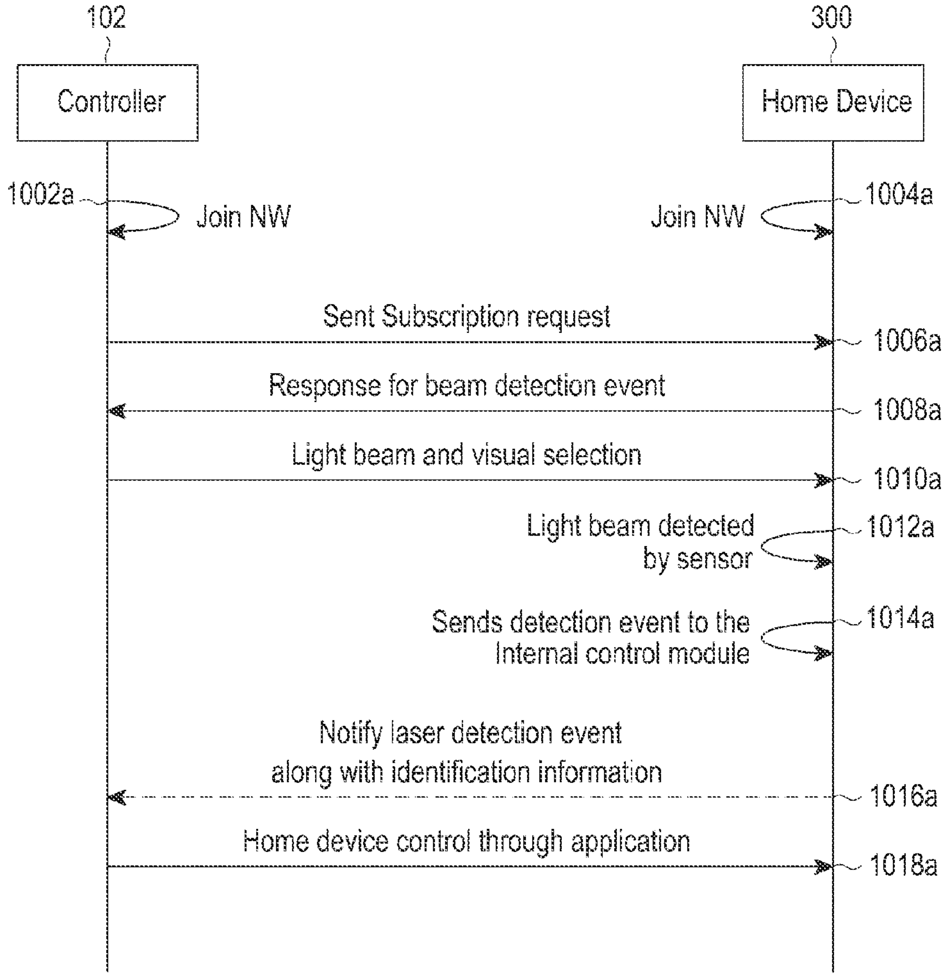
FIG. 10A is a sequence diagram depicting operations involved in selecting and controlling the home network device by subscribing to light detection event according to various embodiments of the present disclosure.

FIG. 10A is a sequence diagram depicting operations involved in selecting and controlling the HND by subscribing to light detection events according to various embodiments of the present disclosure.

Referring to FIG. 10A, the controller 102 joins into the home network at operation 1002*a*. The HND 300 also joins into the home network at operation 1004*a*. At operation 1006*a*, the controller 102 sends the light source detection event subscription request to the home device 300. After receiving the light source detection event subscription request, at operation 1008*a*, the home device 300 sends the light source detection event accept response to the controller 102. The subscription ensures that the controller 102 desires to control the home device 300. When the user intends to select the HND 300, the user points the light beam from the light source 104 to enable visual selection of the HND 300. In an embodiment of the present disclosure, the controller 102 sends the light beam to select the home device 300 at operation 1010*a*.

The laser beam detection circuit 604 in the home device 300 detects the light beam at operation 1012*a*. In an embodiment of the present disclosure, the laser beam detection circuit 604 sends the detection event to the HND control module 510 at operation 1014*a*.

In an embodiment of the present disclosure, at operation 1016*a*, the home device 300 notifies the light signal detection event along with identification information to the controller 102.

The controller 100 triggers the control UI though which user controls the HND 300 at operation 1018*a*. For example, the user controls the temperature of the HVAC from the control UI.

Figure 10B:
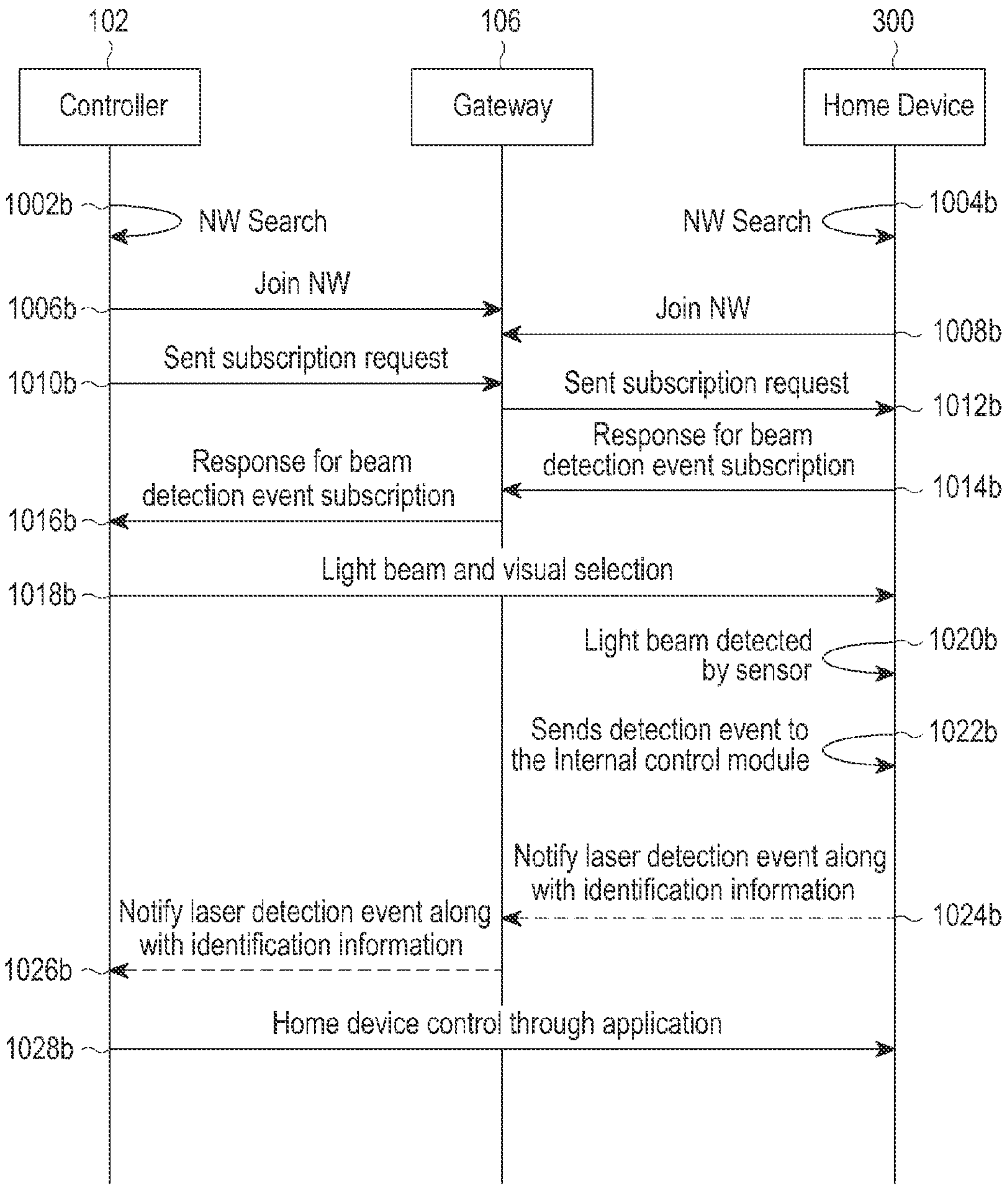
FIG. 10B is a sequence diagram depicting operations involved in selecting and controlling the home network device by subscribing to light detection event with gateway according to various embodiments of the present disclosure.

FIG. 10B is a sequence diagram depicting operations involved in selecting and controlling the HND by subscribing to light detection events with the gateway according to various embodiments of the present disclosure.

Referring to FIG. 10B, initially, the controller 102 searches the home network at operation 1002*b* and the home device 300 also searches the home network at operation 1004*b*. At operation 1006*b*, the controller 102 joins into the home network and the HND 300 also joins into the home network at operation 1008*b*.

At operation 1010*b*, the controller 102 sends the light source detection event subscription request to the gateway 106. At operation 1012*b*, the gateway 106 passes the light source detection event subscription request to the home device 300. After receiving the light source detection event subscription request, the home device 300 sends the light source detection event accept response to the gateway 106 at operation 1014*b*. At operation 1016*b*, the gateway 106 passes the light source detection event accept response to the controller 102.

The light source detection events accept response ensures that the controller 102 desires to control the home device 300. When the user intends to select the HND 300, the user points the light beam from the light source 104 to enable visual selection of the HND 300. In an embodiment of the present disclosure, the controller 102 sends the light beam to select the home device 300 at operation 1018*b*.

The laser beam detection circuit 604 in the home device 300 detects the light beam at operation 1020*b*. In an embodiment of the present disclosure, the laser beam detection circuit 604 sends the detection event to the HND control module 510 at operation 1022*b*.

In an embodiment of the present disclosure, at operation 1024*b*, the home device 300 notifies the light signal detection event along with identification information to the gateway 106. At operation 1026*b*, the gateway 106 passes the light signal detection event notification along with identification information to the controller 106.

The controller 100 triggers the control UI though which user controls the HND at operation 1028*b*. For example, the user controls the temperature of the HVAC from the control UI.

Figure 11:
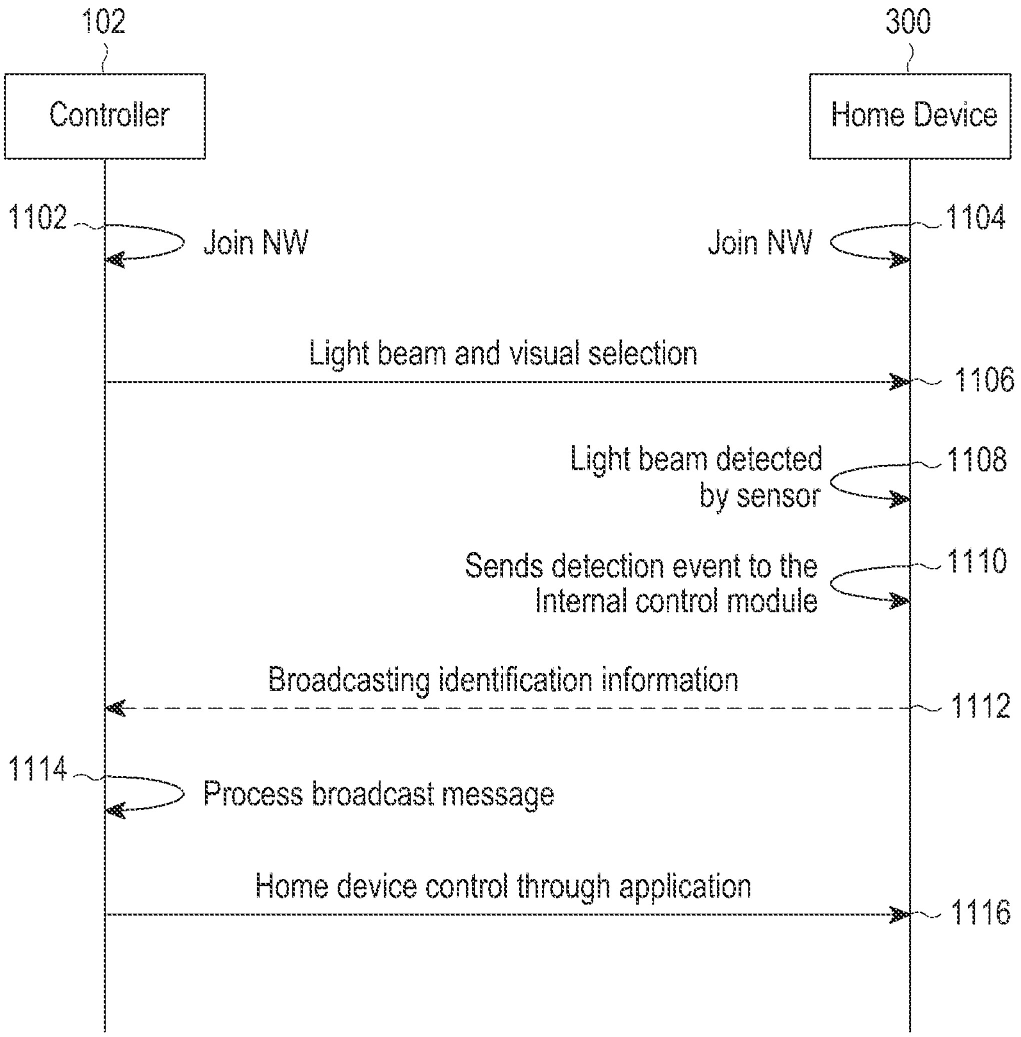
FIG. 11 is a sequence diagram depicting operations involved in selecting and controlling the home network device based on broadcast information according to various embodiments of the present disclosure.

FIG. 11 is a sequence diagram depicting operations involved in selecting and controlling the HND based on broadcast information according to various embodiments of the present disclosure.

Referring to FIG. 11, initially, the controller 102 joins into the home network at operation 1102 and the home device 300 also joins into the home network at operation 1104. When the user intends to select the home device 300, the user points the light beam from the light source 104 to enable visual selection of the home network device 300. In an embodiment of the present disclosure, the controller 102 sends the light beam to the home device 300 to select the home device 300 at operation 1106.

In an embodiment of the present disclosure, plurality of controllers $\mathbf{102}_1$-$\mathbf{102}_n$ send the light beam to the home device 300 to select the home device 300.

The laser beam detection circuit 604 detects the light signal in the HND 300 at operation 1108. At operation 1110, the laser beam detection circuit 604 sends the detection event to the home network control module 510 in the HND 300. In an embodiment of the present disclosure, the HND 300 broadcasts the identification information to the controller 102 at operation 1112. In an embodiment of the present disclosure, the home device 300 broadcasts the identification information into the multiple controllers. In an embodiment of the present disclosure, the identification information is the UID. The controller 102 processes the broadcast message at operation 1114. The broadcasted identification information is used to identify each home device in the home network. The controller 102 triggers the control UI to the user to control the home device 300. Further, at operation 1116, the user controls the home device 300 through the application control UI.

Figure 12:
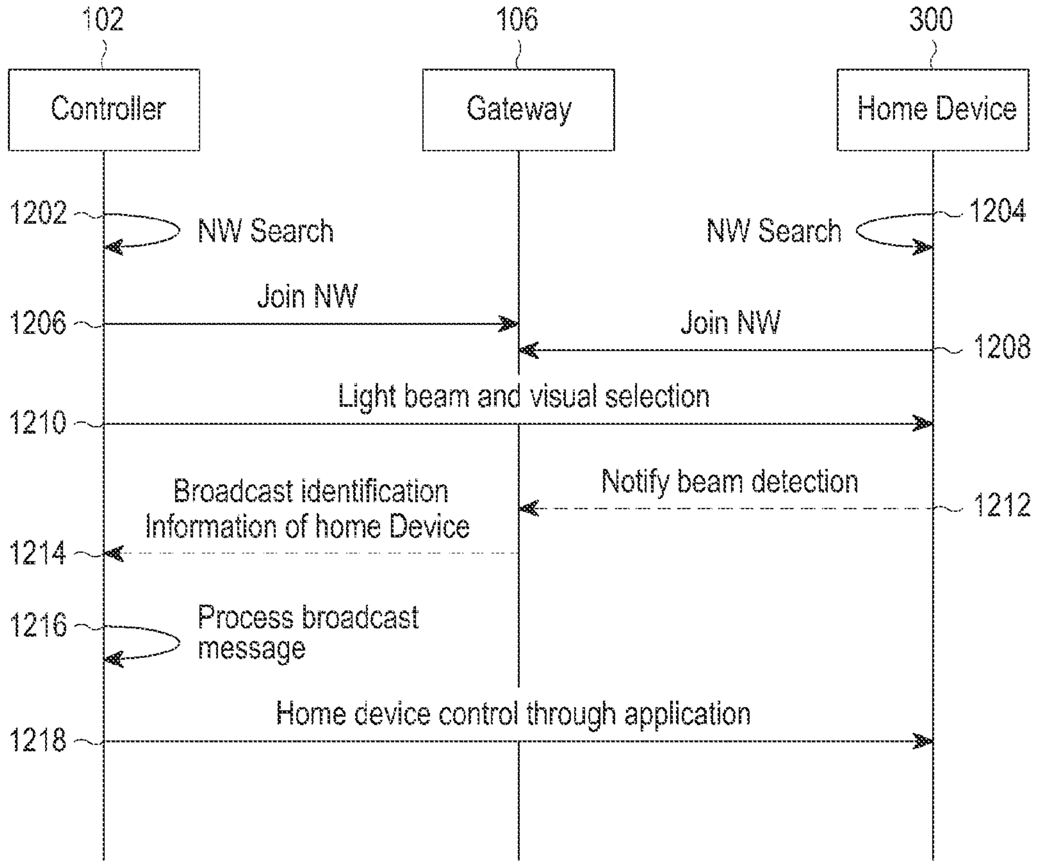
FIG. 12 is a sequence diagram depicting selection operations involved in selecting and controlling the home network device based on broadcast information with a gateway according to various embodiments of the present disclosure.

FIG. 12 is a sequence diagram depicting selection operations involved in selecting and controlling the HND based on broadcast information with a gateway according to various embodiments of the present disclosure.

Referring to FIG. 12, initially, the controller 102 searches the home network at operation 1202 and the home device 300 also searches the home network at operation 1204. The controller 102 joins into the home network at operation 1206 and the HND 300 also joins into the home network at operation 1208. When the user intends to select the home device 300, the user points the light beam from the light source 104 to enable visual selection of the HND 300. In an embodiment of the present disclosure, the controller 102 sends the light beam to the home device 300 to select the home device 300 at operation 1210. In an embodiment of the present disclosure, the light source can be the laser, or any other light source with the properties of a laser.

In an embodiment of the present disclosure, a plurality of controllers $\mathbf{102}_1$-102*n* send the light beam to the HND 300 to select the HND 300.

In an embodiment of the present disclosure, the home device 300 notifies the light beam detection event to the gateway 106 at operation 1212. In an embodiment of the present disclosure, the controller in each electronic device 100 is assigned UID so that it can be uniquely identified by home devices. In an example, a device mapping table is generated by using the UID in the home device 300 and is used to map the home network device based on the light beam from the controller 102. In an embodiment of the present disclosure, the gateway 106 broadcasts the identification information to the controller 102 at operation 1214. The controller 102 processes the broadcast message at operation 1216.

The broadcast identification information is used to identify each home device in the home network. The controller 102 triggers the control UI to the user to control the home device.

Further, the user controls the home device 300 through the application control UI at operation 1218.

In an embodiment of the present disclosure, if the home device is controlled using the plurality of controllers (as shown in FIG. 3A), then the controller in each electronic device triggers the control UI in the electronic device and user controls the home device through the application control UI.

Figure 13:
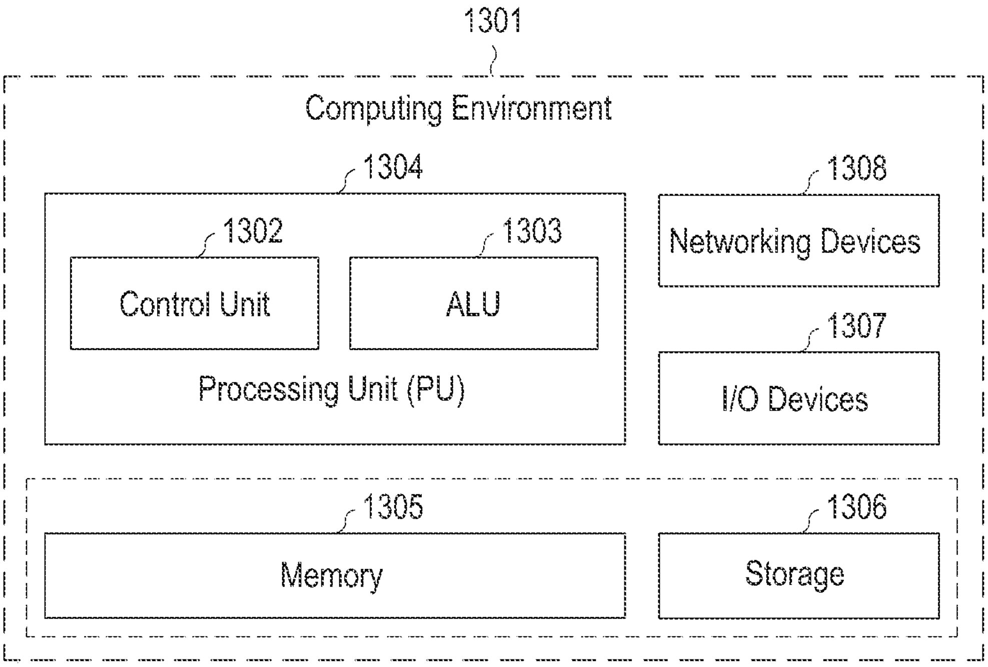
FIG. 13 illustrates a computing environment implementing the method for selecting and controlling the home network device according to various embodiments of the present disclosure.

FIG. 13 illustrates a computing environment implementing the method for selecting and controlling an HND according to various embodiments of the present disclosure.

Referring to FIG. 13, a computing environment 1301 comprises at least one processing unit 1304 that is equipped with a control unit 1302 and an arithmetic logic unit (ALU) 1303, a memory 1305, a storage unit 1306, a plurality of networking devices 1308 and a plurality input/output (I/O) devices 1307. The processing unit 1304 is responsible for processing the instructions of the algorithm. The processing unit 1304 receives commands from the control unit in order to perform its processing. Further, any logical and arithmetic operations involved in the execution of the instructions are computed with the help of the ALU 1303.

The overall computing environment 1301 can be composed of multiple homogeneous and/or heterogeneous cores, multiple CPUs of different kinds, special media, and other accelerators. The processing unit 1304 is responsible for processing the instructions of the algorithm. Further, the plurality of processing units 1304 may be located on a single chip or distributed over multiple chips.

The algorithm comprising of instructions and codes required for the implementation are stored in either the memory unit 1305 or the storage 1306 or both. At the time of execution, the instructions may be fetched from the corresponding memory 1305 and/or storage 1306, and executed by the processing unit 1304.

In the case of any hardware implementations various networking devices 1308 or external I/O devices 1307 may be connected to the computing environment to support the implementation through the networking unit and the I/O device unit.

The various embodiments disclosed herein can be implemented through at least one software program running on at least one hardware device and performing network management functions to control the elements. The elements shown in FIGS. 1 to 13 include blocks which can be at least one of a hardware device, or a combination of hardware device and software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a home network device (HND) by a controller, the method comprising:

generating a light signal from a light source;

obtaining identification information from the HND detecting a light beam event based on the light signal;

activating a control user interface (UI) for the HND based on the identification information; and sending control messages to the HND through the control UI.

2. The method of claim 1, wherein the obtaining of the identification information includes:

registering the controller as the light source; and if the light signal from the light source is pointed towards the HND, receiving the identification information from one of the HND and a gateway of the home network.

3. The method of claim 1, wherein the obtaining of the identification information includes:

registering the controller as the light source;

subscribing to the beam detection event; and if the light signal from the light source is pointed towards the HND, receiving the beam detection event including the identification information from the HND and a gateway of the home network.

4. The method of claim 1, wherein the obtaining of the identification information includes:

registering the controller as the light source; and if the light signal from the light source is pointed towards the HND, receiving a broadcast message including the identification information from the HND and a gateway of the home network.

5. The method of claim 1, wherein the light signal comprises a laser signal.

6. A method of receiving control information by a home network device (HND), the method comprising:

if a light beam event based on a light signal from at least one electronic device is detected, sending identification information of the HND to the at least one electronic device; and receiving the control information through a control UI activated based on the identification information on the at least one electronic device.

7. An electronic device for controlling a home network device (HND), the electronic device comprising:

a controller; and a light source, wherein the controller is configured to:

generate a light signal from a light source;

obtain identification information from the HND detecting a light beam event based on the light signal;

activate a control User Interface (UI) for the HND based on the identification information; and send control messages to the HND by using the control UI.

8. The electronic device of claim 7, wherein the controller is configured to obtain the identification information by:

registering the controller as the light source; and if the light signal from the light source is pointed towards the HND, receiving the identification information from one of the HND and a gateway of the home network.

9. The electronic device of claim 7, wherein the controller is configured to obtain the identification information by:

registering the controller as the light source;

subscribing to the beam detection events; and if the light signal from the light source is pointed towards the HND, receiving the beam detection event including the identification information from the HND.

10. The electronic device of claim 7, wherein the controller is configured to obtain the identification information by:

registering the controller as the light source; and if the light signal from the light source is pointed towards the HND, receiving, at the controller, a broadcast message from the HND with the identification information.

11. The electronic device of claim 7, wherein the light signal comprises a laser signal.

12. A home network device (HND) for receiving control information, the HND comprising:

a controller configured to:

if a light beam event based on a light signal from at least one electronic device is detected, send identification information of the HND to at least one electronic device; and receive the control information through a control UI activated based on the identification information on the at least one electronic device.

* * * * *